United States Patent Office 3,434,007
Patented Mar. 18, 1969

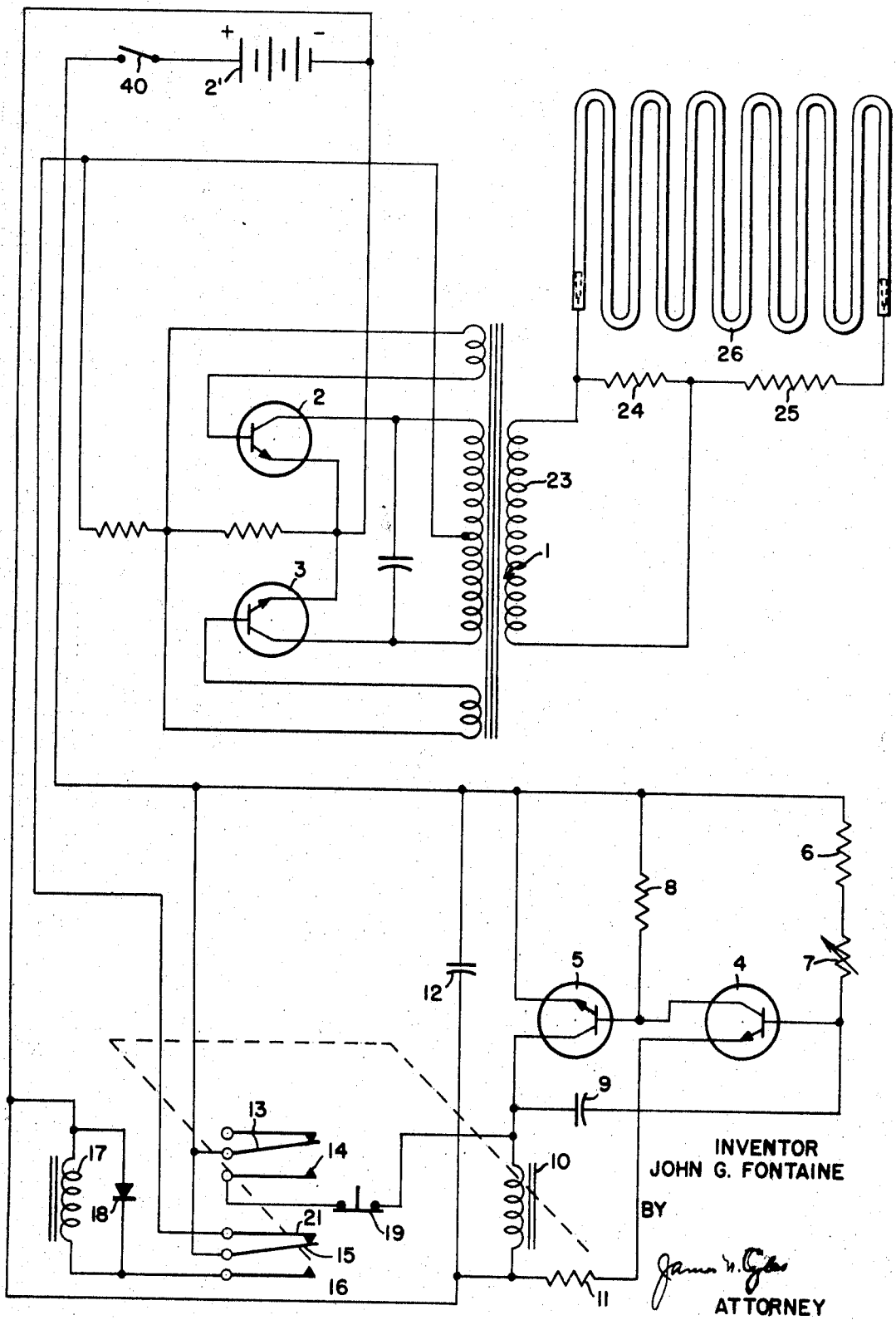

3,434,007
ELECTRICAL CONTROL MEANS FOR A CHANGEABLE EXHIBITOR
John G. Fontaine, Fort Lauderdale, Fla., assignor to Automatic Displays, Inc., Fort Lauderdale, Fla., a corporation of Florida
Filed Oct. 24, 1966, Ser. No. 588,877
U.S. Cl. 315—119            4 Claims
Int. Cl. H05b 37/02, 39/02, 41/02

ABSTRACT OF THE DISCLOSURE

An illuminating system is disclosed for controlling the illumination of a gas-filled lamp in coordination with the operation of an actuator associated with the lamp. A timing circuit connected to a direct current source includes a capacitor connected to a relay through a translating circuit, and the timing circuit controls energization of an inverter circuit operating the lamp. The relay's coil is energized upon charging of the capacitor to operate relay contacts which disable the inverter circuit, hold the relay coil energized, and also energize a solenoid which operates the actuator. After the cycle of operation of the actuator, it deenergizes the relay coil to reactivate the inverter circuit and deactivate the solenoid. Thus, the lamp is turned off when the actuator is being operated.

---

This invention relates to an arrangement adapted for employment in a changeable exhibitor or display device, and more particularly in a device of the type disclosed in my co-pending application Ser. No. 470,359, filed July 8, 1965, now U.S. Patent No. 3,336,687. It will be apparent however, from the following description that the device may be capable of use in other environments.

In the above-mentioned application for patent is disclosed endless conveyor belts which support translucent, flexible panels which are carried by the belts in timed sequence to bring them successively to a sight opening or window formed in the cover of a casing in which the display apparatus or exhibitor is contained. Illuminating means are provided for illuminating the panels as they are successively brought into viewing position at the sight opening or window. The illuminating means is adapted to operate for a period of time sufficient to enable each panel to be properly viewed.

It is an object of the present invention to provide an arrangement by which an illuminating means for the viewing of the panels will be operated at the required times and for the needed periods of time in order to secure the desired co-action of the conveyor and lighting means for the best and accurate exposure of the panels.

More particularly, the invention contemplates the employment of a circuit in which transistors are employed with other components to provide frequency-determining circuitry whereby the illuminating means will be set in operation at the required times and for given periods.

With these and other objects to be hereinafter set forth in view, I have devised the arrangement of parts to be described and more particularly pointed out in the claims appended hereto.

Referring to the drawing, wherein is disclosed an electrical circuit diagram of the improved apparatus, 1 indicates a transformer of conventional form, electrically connected to a source of D.C. or direct current, such as might be provided by a battery 2'. The circuit includes a timing arrangement which consists primarily of a direct coupled two-transistor disposition.

The transistor shown at 4 forming part of the timer and associated components such as the fixed resistor 6, variable resistor 7 and timing capacitor 9, comprise the frequency-determining circuitry. The transistor shown at 5 is employed as a relay driver, serving to switch current to a relay shown at 10 when pulsed by the transistor 4.

When power is applied, the timing capacitor 9 will charge until the conduction point of the transistor 4 is reached. When the transistor 4 conducts, it applies a turn-on bias pulse to the transistor 5 which then energizes the relay 10. Meanwhile, capacitor 9 discharges through the base of transistor 4. The bias adjustment fixed resistor shown at 8 provides a measure of bias to the base of the transistor 5 to thereby control emitter collector leakage under high ambient temperature conditions. The fixed resistor shown at 11 provides necessary current limitation to the timer.

At 12 is shown an electrolytic capacitor constituting a buffer capacitor across the power leads that are shown supplying the current to the timer.

When the relay 10 is energized, the contact member 13 thereof touches the point 14, which applies a holding voltage to the relay 10, locking it in an energized condition, and at the same time contact 15 disconnects from contact 21 disabling the inverter and lighting circuits.

With the relay 10 energized, the contact member 15 touches the point 16, energizing a solenoid valve shown at 17, which applies pressure to a piston, not shown, causing the piston to begin its travel. A diode, shown at 18, is a protective diode used to drain off the peak voltage that is built up across the solenoid coil during commutation. When the piston reaches the end of its travel it actuates a normally-closed, push-button switch 19 which opens the holding circuit of the relay 10. This causes the relay 10 to de-energize, removing the current from the solenoid valve 17 and allowing the piston that is controlled by said valve to be brought to its rest position by mechanical means. The push-button switch 19 closes and power is now restored to the timing delay circuit, while at the same time power is restored to invertor circuit instantly lighting gaseous illuminator 26.

When the point 21 of the relay 10 connects to the point 15, as shown in the drawing, the transistor shown at 2, or that which is shown at 3, begins conducting, blocking the opposing transistor. The conducting transistor remains in its conducting or charged state until the frequency-determining characteristics of the circuit act to switch off one of the transistors and switch on the other transistor. When the inverter is switching at its designed frequency, alternating pulses of current are switched through the primary winding of the transformer 1. This alternate switching of current in the primary winding of the transformer induces an alternating current and voltage in the secondary winding 23 of the transformer. This now stepped-up voltage and current is applied to the load elements fixed resistor 24, to the load ballast resistor 25 and to the gaseous illuminator 26. This stepped-up voltage must be of such a value as to cause the ionization of the gases in the gaseous illuminator 26.

The load ballast resistor 25, being connected in series with the gaseous illuminator 26, provides any additional load resistance necessary to properly match the total load to the secondary winding 23 of the transformer 1. The fixed resistor 24 acts as a protective load to the inverter system should the gaseous illuminator 26 or the load ballast resistor 24 become open circuited. The output may be shorted at any time without damage to any component in the circuit. Shorting of the output merely presents a heavy load to the inverter which it cannot drive. As a result, the inverter ceases oscillation and idles until the short is removed.

When the timer circuit again fires, the relay 10 will be energized, separating the point 21 from the point 15, thus de-energizing the inverter circuit and recycling as heretofore described. The control switch for the circuit is indicated at 40.

Having thus described an embodiment of the invention, it is obvious that the same is not to be restricted thereto, but is broad enough to cover all structures coming within the scope of the annexed claims.

What I claim is:

1. An illuminating system for controlling the illumination of a gas-filled lamp in coordination with the operation of an actuator associated with the lamp, said system including in combination a source of direct current, inverter circuit means coupled to said lamp and to said source for converting direct current from said source to pulsating current to operate said lamp, power supplying means connected between said source and said inverter circuit means for supplying direct current to said inverter circuit means, a timing circuit connected to said source including a relay having a coil and contacts, a capacitor, and circuit means connected between said coil and said capacitor responsive to charging of said capacitor to a predetermined level to energize said relay coil and discharge said capacitor, a holding circuit connected to said source and said relay coil including contacts of said relay operated upon energization of said coil to hold said coil energized, said holding circuit further including switching means, said power supplying means including contacts of said relay operated to disable said inverter circuit means upon energization of said relay, and a control circuit connected to said source including solenoid means and contacts of said relay operated upon energization of said coil to energize said solenoid means to operate said actuator, said actuator having a cycle of operation and upon completion of said cycle operating said switching means to break said holding circuit and thereby deenergize said relay coil to in turn reactivate said inverter circuit means and deactivate said solenoid means, thereby intermittently energizing said lamp.

2. The system as claimed in claim 1 in which said circuit means connected between said coil and said capacitor includes resistance means connected to said capacitor and said source through which said capacitor charges, and first and second transistors each having an input portion and an output portion, said first transistor having said input portion thereof connected to said capacitor and said output portion thereof connected to said input portion of said second transistor, and said second transistor having said output portion thereof connected to said source and to said relay coil.

3. The system as claimed in claim 2 in which said inverter circuit means includes a pair of transistors arranged so that when either transistor is conducting, the other transistor is blocked.

4. An illuminating system for controlling the illumination of a gas filled lamp in coordination with the operation of an actuator associated with the lamp, said system including in combination a source of direct current, inverter circuit means coupled to said lamp and to said source for converting direct current from said source to pulsating current to operate said lamp, a timing circuit connected to said source including a relay having a coil and contacts, a capacitor, and translating circuit means connected between said coil and said capacitor responsive to charging of said capacitor to a predetermined level to energize said relay coil and discharge said capacitor, means for holding said coil energized including switching means, means including contacts of said relay operated to disable said inverter circuit means upon energization of said relay, and a control circuit connected to said source including solenoid means and contacts of said relay operated upon energization of said coil to energize said solenoid means to operate said actuator, said actuator having a cycle of operation and upon completion of said cycle operating said switching means to deenergize said relay coil to in turn reactivate said inverter circuit means and deactivate said solenoid means, thereby intermittently energizing said lamp.

References Cited

UNITED STATES PATENTS 2,964,676  12/1960  Davies et al.

FOREIGN PATENTS 834,099  5/1960  England.
1,224,928  2/1960  France.

JOHN W. HUCKERT, *Primary Examiner.*

R. F. POLISSACK, *Assistant Examiner.*

U.S. Cl. X.R.

315—209, 225, 360; 317—148.5